US011372939B2

(12) United States Patent
Pillarisetty et al.

(10) Patent No.: US 11,372,939 B2
(45) Date of Patent: Jun. 28, 2022

(54) SYSTEMS AND METHODS FOR CLUSTERED INVENTORY MANAGEMENT

(71) Applicant: Walmart Apollo, LLC, Bentonville, AR (US)

(72) Inventors: Bala Srinivas Pillarisetty, Pleasanton, CA (US); Sermandurai Venkatachalam Konar, Fremont, CA (US); Harikrishnan Ramakrishna Pillai, Fremont, CA (US); Santhosh Kumar Ramalingam, Sunnyvale, CA (US); Chandni Jain, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/983,733

(22) Filed: Aug. 3, 2020

(65) Prior Publication Data

US 2022/0035876 A1 Feb. 3, 2022

(51) Int. Cl.
*G06F 16/953* (2019.01)
*G06F 16/93* (2019.01)
*G06Q 10/08* (2012.01)

(52) U.S. Cl.
CPC ........... *G06F 16/953* (2019.01); *G06F 16/93* (2019.01); *G06Q 10/087* (2013.01)

(58) Field of Classification Search
CPC ...... G06F 16/953; G06F 16/93; G06Q 10/087
USPC ........................................................ 707/769
See application file for complete search history.

(56) References Cited

U.S. PATENT DOCUMENTS

| | | | | |
|---|---|---|---|---|
| 5,848,421 A * | 12/1998 | Brichta | ............... | G06F 16/2365 |
| 6,061,697 A * | 5/2000 | Nakao | ................... | G06Q 10/10 |
| | | | | 715/229 |
| 6,484,149 B1 * | 11/2002 | Jammes | ............... | G06F 16/958 |
| | | | | 705/26.62 |
| 6,820,094 B1 * | 11/2004 | Ferguson | ............... | G06F 16/93 |
| | | | | 707/999.2 |
| 7,051,022 B1 * | 5/2006 | Faisal | ..................... | G06F 16/35 |
| | | | | 707/999.005 |
| 7,181,438 B1 * | 2/2007 | Szabo | ................ | G06F 21/6245 |
| | | | | 705/14.27 |
| 7,698,316 B2 * | 4/2010 | Song | ........................ | G06N 5/02 |
| | | | | 707/665 |

(Continued)

*Primary Examiner* — Mark E Hershley
(74) *Attorney, Agent, or Firm* — Duane Morris LLP; Manita Rawat

(57) ABSTRACT

An inventory management system may have at least one document database and a search server. The search server may have a data structure engine storing a hierarchical data structure, at least one indexing engine, and a non-transitory computer readable medium having instructions, wherein the instructions, when executed by a processor cause the search server to receive an input document, parse one or more sub documents from the input document, prepare a search document based on the one or more sub documents, and update, by the data structure engine, the hierarchical data structure based on the search document. The search engine may further construct a relationship query based on a query for information and the hierarchical data structure, determine one or more sub documents responsive to the relationship query based on the hierarchical data structure, and extract information requested by the query from the sub documents.

20 Claims, 6 Drawing Sheets

(56) References Cited

U.S. PATENT DOCUMENTS

| | | | | |
|---|---|---|---|---|
| 7,865,495 B1* | 1/2011 | Roizen | G06F 16/951 | 707/765 |
| 8,234,263 B2* | 7/2012 | Pradhan | G06F 16/335 | 707/711 |
| 8,965,921 B2* | 2/2015 | Gajic | G06F 16/285 | 709/201 |
| 9,230,011 B1* | 1/2016 | Tamilmani | G06F 16/31 | |
| 9,342,492 B1* | 5/2016 | Warila | H04L 67/34 | |
| 9,372,856 B2* | 6/2016 | MacDonald | G06F 16/93 | |
| 10,496,640 B2* | 12/2019 | Taylor | G06F 16/24534 | |
| 2001/0056362 A1* | 12/2001 | Hanagan | G06F 16/289 | 705/40 |
| 2004/0064334 A1* | 4/2004 | Nye | G06F 16/9537 | 705/317 |
| 2004/0168115 A1* | 8/2004 | Bauernschmidt | G06Q 10/10 | 715/238 |
| 2006/0229896 A1* | 10/2006 | Rosen | G06Q 10/1053 | 705/321 |
| 2006/0277205 A1* | 12/2006 | Song | G06N 5/02 | 707/999.102 |
| 2008/0183459 A1* | 7/2008 | Simonsen | G06F 40/58 | 704/1 |
| 2009/0254572 A1* | 10/2009 | Redlich | G06Q 10/107 | |
| 2009/0327243 A1* | 12/2009 | Pradhan | G06F 16/958 | 707/E17.046 |
| 2010/0250497 A1* | 9/2010 | Redlich | H04L 63/105 | 707/661 |
| 2012/0180073 A1* | 7/2012 | Hung | G06F 16/9566 | 715/234 |
| 2012/0239665 A1* | 9/2012 | Okajima | G06F 16/345 | 707/E17.058 |
| 2014/0172417 A1* | 6/2014 | Monk, II | G06F 40/30 | 704/9 |
| 2016/0180438 A1* | 6/2016 | Boston | G06Q 30/0282 | 705/26.7 |
| 2017/0235848 A1* | 8/2017 | Van Dusen | G06N 20/00 | 705/12 |
| 2017/0293676 A1* | 10/2017 | Lowe | G06F 16/245 | |
| 2017/0315683 A1* | 11/2017 | Boucher | G06F 16/2228 | |
| 2018/0096203 A1* | 4/2018 | King | G06F 16/00 | |
| 2018/0268015 A1* | 9/2018 | Sugaberry | G06Q 10/067 | |
| 2019/0310978 A1* | 10/2019 | Jiang | G06F 16/2456 | |
| 2019/0347668 A1* | 11/2019 | Williams | G06V 30/418 | |
| 2020/0051147 A1* | 2/2020 | Tsai | G06Q 30/0625 | |

* cited by examiner

SYSTEMS AND METHODS FOR CLUSTERED INVENTORY MANAGEMENT

TECHNICAL FIELD

This application relates generally to inventory management and, more particularly, to systems and methods for clustered inventory tracking in a database system using searchable hierarchical data structure.

BACKGROUND

Inventory and supply chain management involve complex physical and electronic connections to track product, offer, sale, and other pertinent information. Retail organizations utilize a variety of tools to provide internal and external inventory management. Internal management involves tracking of inventory across various systems and physical locations as products and services are brought into inventory and disposed out of inventory. External management involves providing a customer-facing tool for providing information about offers and sales of products and services. For instance, a customer may request to find an offer for a particular product or service, including availability of the product or service. Scaling of inventory management systems as inventories grow and expand becomes a difficult task when many different physical store and warehouse locations are involved especially in view of a desire to provide quick response times for customer queries. For instance, a customer may desire to inquire about and purchase a product, but may be dissuaded from doing so if prompt delivery of accurate offer and availability options are not provided. The present disclosure addresses these and other problems that are not sufficiently addressed by the prior art.

BRIEF DESCRIPTION OF THE DRAWINGS

Aspects of the present disclosure are best understood from the following detailed description when read with the accompanying figures in which like reference characters refer to the same parts throughout the different views. It is noted that, in accordance with the standard practice in the industry, various features are not drawn to scale and emphasis instead being placed upon illustrating embodiments of the present invention. In fact, the dimensions of the various features may be arbitrarily increased or reduced for clarity of discussion. The scope of the present patent application is not limited to the disclosed embodiments, but also encompasses combinations of the disclosed embodiments, as well as modifications to the disclosed embodiments.

SUMMARY OF THE INVENTION

Figure 1:
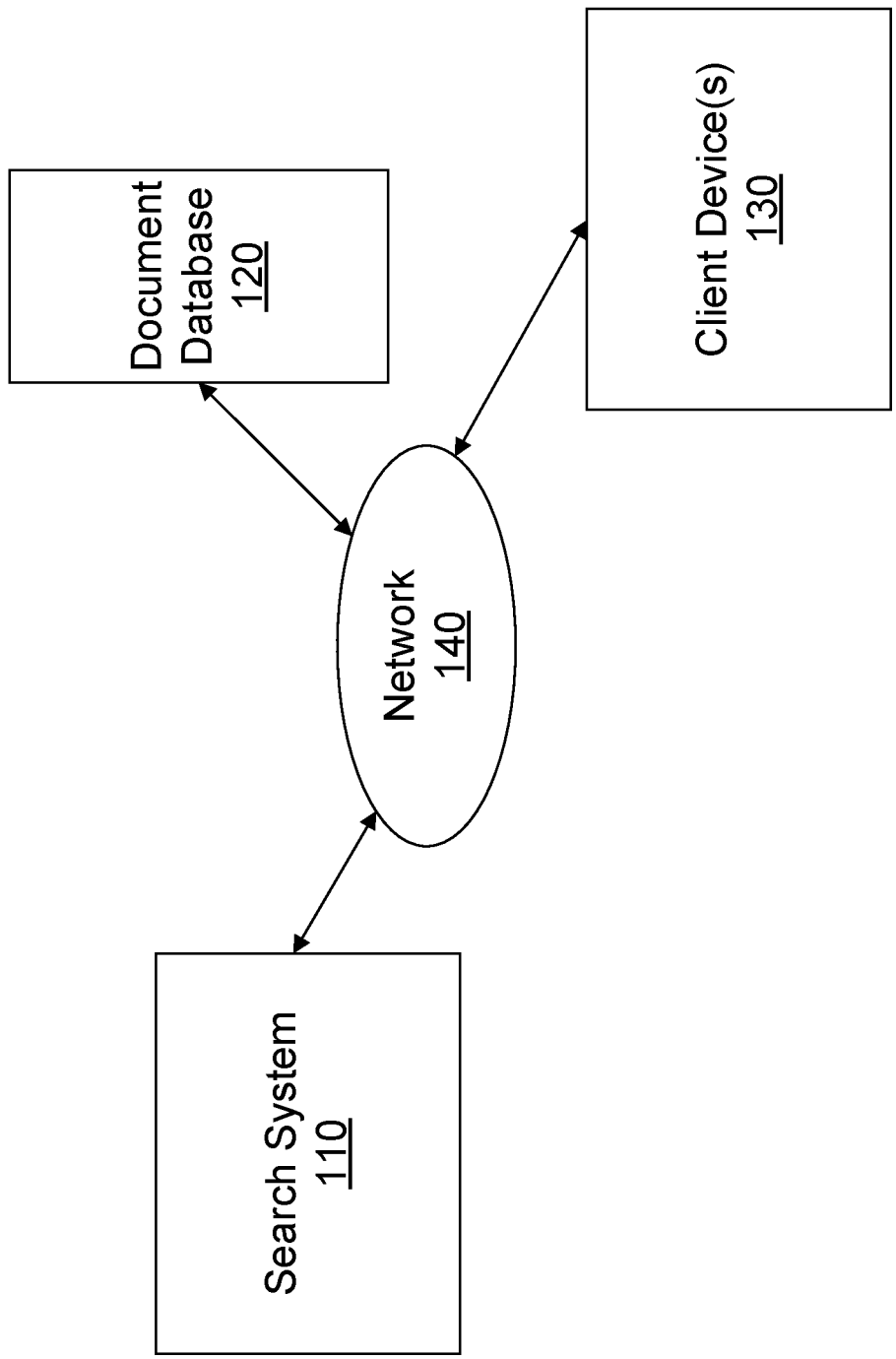
FIG. 1 illustrates an exemplary system in accordance with some embodiments of the present disclosure.

The embodiments described herein enable large and complex datasets to be acted upon by a management system for providing accurate, efficient, and timely response to queries for information by a client-facing device, such as a system management device or client device. The disclosed embodiments may include indexing engines configured to receive information from input documents and transform the information into searchable hierarchical data structures using one or more clustering algorithms particularly tailored to the source of information (e.g., the input document itself). The disclosed embodiments may further include a query engine to translate a search query into a relationship query to search the hierarchical data structure for nodes and connectors that identify information responsive to the original query.

For example, in one embodiment, an inventory management system is disclosed. The system may include at least one document database storing a plurality of documents containing data and a search server communicatively coupled to the document database. The search server may include a data structure engine storing a hierarchical data structure, at least one indexing engine, and a non-transitory computer readable medium having instructions stored thereon, wherein the instructions, when executed by a processor cause the search server to receive an input document from the document database, parse one or more sub documents from the input document, prepare a search document based on the one or more sub documents, and update, by the data structure engine, the hierarchical data structure based on the search document. The non-transitory computer readable medium may also store instructions that when executed by the processor further cause the search server to construct a relationship query based on a query for information and the hierarchical data structure, determine one or more sub documents responsive to the relationship query based on the hierarchical data structure, and extract information requested by the query from the one or more sub documents responsive to the relationship query.

In other embodiments, a computer-implemented method for clustered inventory management is disclosed. The method may include receiving, at an indexing engine, an input document from a document database, parsing one or more sub documents from the input document, preparing a search document based on the one or more sub documents and an indexing algorithm associated with the indexing engine, and updating the hierarchical data structure based on the search document. The method may further include, in response to a query for information from the input document: constructing a relationship query based on the query for information and the hierarchical data structure, determining, by the search server, one or more sub documents responsive to the relationship query based on the hierarchical data structure; and extracting information requested by the query from the one or more sub documents responsive to the relationship query.

In yet other embodiments, a non-transitory computer readable medium is disclosed. The non-transitory computer readable medium has instructions stored thereon, wherein the instructions, when executed by a processor cause a device to perform operations for clustered inventory management. The operations may include receiving, at an indexing engine, an input document from a document database, parsing one or more sub documents from the input document, preparing a search document based on the one or more sub documents and an indexing algorithm associated with the indexing engine, and updating the hierarchical data structure based on the search document. The operations may further include, in response to a query for information from the input document: constructing a relationship query based on the query for information and the hierarchical data structure, determining, by the search server, one or more sub documents responsive to the relationship query based on the hierarchical data structure, and extracting information requested by the query from the one or more sub documents responsive to the relationship query.

It should be understood that the disclosed applications of the embodiments are exemplary and that other clustered data management systems may implement the same or similar systems and methods to provide an improved system for indexing and responding to search queries related to the managed data.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The embodiments described herein include hardware and/or software components enabling an improved inventory management system using a clustering process to create data nodes and connections between data nodes such that subsequent search functions return relevant information quickly, efficiently, and accurately. The disclosed system is customizable according to various applications, such as types of inventory and/or other non-inventory implementations. The disclosed system may be particularly applicable to manage complex and large inventory systems that face particular issues with maintaining connections and up-to-date information.

FIG. 1 is a block diagram of an exemplary inventory management system 100, according to a disclosed embodiment. The inventory management system 100 may be configured to perform one or more processes disclosed herein to provide inventory management to an end user. The inventory management system 100 may include a search system 110, a document database 120, and one or more client devices 130 connected by a network 140. The various components of the inventory management system 100 may be coupled to each other for performing processes disclosed herein. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces.

The search system 110 may be a computing device, such as a server, configured to perform one or more processes in conjunction with input from the document database 120 and one or more client devices 130 in order to establish a clustered inventory tracking system and execute searches for information against the inventory tracking system using client-facing tools. The search system 110 may include one or more hardware and/or software engines or modules that perform set-up and querying tasks. For instance, the search system 110 may include components that provide an updated, active index of inventory information and retrieve relevant information from the index in response to a query. Consistent with disclosed embodiments, the search system 110 includes indexing features configured to identify relationships between entities such that all entities can be acted on without requiring a connection to a limited set of searchable information.

The document database 120 may be a storage device, such as an electronic database, memory, or other storage system configured to receive, store, retrieve, and provide one or more documents. Document database 120 may be any database appropriate for the storage and retrieval of data, such as NoSQL. Document database 120 may be implemented as a server including the database and configured to communicate with the search system 110. As used herein, a document may refer to a set of data that describes something. Therefore, the input data may be referred to as an input document. An input document may refer to an offer or sale of a product or service of the relevant inventory being managed. Thus, the input document may contain hundreds of attributes such as types of product or service identifying information, offer information, sale information, amounts of each type, colors, sizes, and shipping information, among others. Each attribute may have a certain relationship to other attributes (e.g. parent/child). These attributes may be represented as objects and arrays within the input document.

In some embodiments, the search system 110 may receive from document database 120 an input document corresponding to any relevant set of data. For the purposes of describing the embodiments herein, the input document may represent an event related to an offer or sale of a product or service in accordance with a relevant inventory. Search server 110 may support input documents in any appropriate data format, such as Java Script Object Notation (JSON), for example. Search server 110 may convert received input documents into JSON, or any other appropriate format as necessary.

Each client device 130 may be a computing device configured to communicate with one or more of the search system 110 and the document database 120. The client device 130 may be a customer-facing device for enabling a customer-user to access inventory information received by the document database 120 and indexed by the search system 130. The client device(s) 130 may include and/or have access to a connection service (e.g., API, GCI service, etc.) that enables the client device 130 to interact with the search system 110. For instance, the client device(s) 130 may be configured to communicate with the search system 110 via a connection that enables delivery of a search query and receipt of search results in relation to inventory managed by the search system 110.

Search system 110 and/or client device(s) 130 may each be a computing device that can be, for example, a server, desktop computer, laptop, mobile device, tablet, thin client, or other device having a communications interface (not shown) that can communicate with other components of system 100. In some embodiments, search system 110 may be associated with, for example, a retail store, such as a retail store having multiple brick-and-mortar locations in addition to an online electronic storefront. For example, search server 110 may receive and store data regarding product/service offers and customer orders and allow for the querying and retrieval of such data for reference or analytical purposes.

The network 140 may be a wired and/or wireless network connecting the various components of the inventory management system 100. For example, the network 140 may include a cloud-based wireless service provided via the Internet. The network 140 may include connections between I/O devices, such as wired or wireless ports, hardware and/or software components, and the like, enabling data communication between connected components. The network 140 may be a single connection mechanism or may encompass different types of connections within the inventory management system 100.

Figure 2:
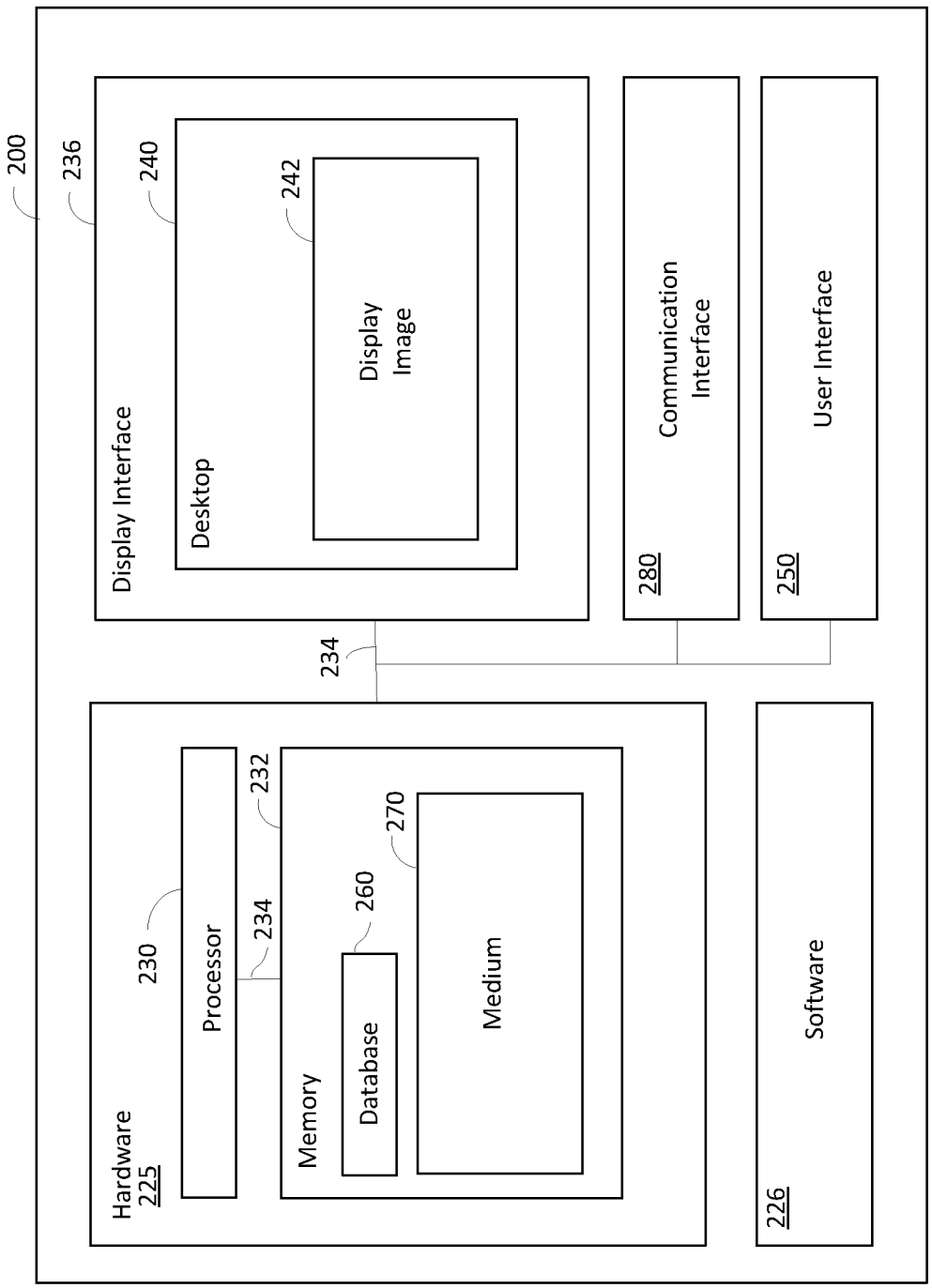
FIG. 2 illustrates an exemplary computing device that may be used with the system shown in FIG. 1, in accordance with some embodiments of the present disclosure.

FIG. 2 is a block diagram of an exemplary computing device 200, which may be used to implement one or more components of the inventory management system 100, such as search system 110 (shown in FIG. 1). In some embodiments, computing device 200 includes a hardware unit 225 and software 226. Software 226 can run on hardware unit 225 such that various applications or programs can be executed on hardware unit 225 by way of software 226. In some embodiments, the functions of software 326 can be implemented directly in hardware unit 225, e.g., as a system-on-a-chip, firmware, field-programmable gate array ("FPGA"), etc. In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor."

Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a few GB of RAM. Memory 232 can also be a ROM, a network interface (NIC), and/or other device(s).

In some embodiments, computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 300 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, display image 242 can be presented to a user on computer displays of a remote terminal (not shown). For example, computing device 200 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 300 and the remote terminals or the servers, such that remote end users can access the information from computing device 200.

In some embodiments, computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

Computing device 200, in some embodiments, can include a database 260 within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage media 270 (only one being shown in FIG. 2). Computer storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein, e.g., steps of the process shown in FIG. 4.

Figure 3:
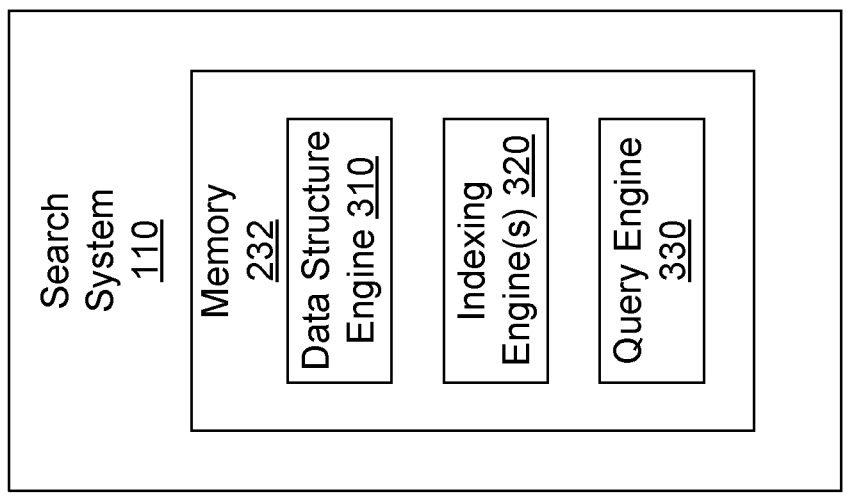
FIG. 3 illustrates an exemplary memory for storing instructions for executing steps of a method that may be used with the system shown in FIG. 1, in accordance with some embodiments of the present disclosure.

FIG. 3 illustrates memory 232 (shown in FIG. 2) and examples of software (SW) modules that may be stored therein. Memory 232 may comprise a non-transitory computer-readable medium (e.g., one or more nonvolatile memory elements, such as EPROM, EEPROM, Flash memory, a hard drive, and so on) that may store SW modules, including at least a data structure engine 310, at least one indexing engine 320, and a querying engine 330. The SW modules, such as those shown an described, may be configured to provide an inventory management system that creates a hierarchical data structure of indexed information using one or more clustering algorithms.

The disclosed SW modules may include features that enable dynamic management of data through a disclosed hierarchical data structure generated by the data structure engine 310. The data structure engine 310 may be configured to provide one or more clustering algorithms to an indexing engine 320. The indexing engine 320 is configured to receive input data, such from an input document, and identify connections between information. The data structure engine 310 may use the connections to update the hierarchical data structure. The indexing engine 320 may be configured to build a search document to send to the data structure engine 310. The search document may include the connections and information needed to update the hierarchical data structure based on an input document. The querying engine 330 may be configured to interact with the updated hierarchical data structure to retrieve information sought in a query. The querying engine 330 may be configured to translate a query into a query formatted for searching the updated hierarchical data structure.

The disclosed SW modules may, according to some aspects, produce a streamlined approach for data management that may otherwise be impractical when prior systems and techniques are applied. For instance, for inventories that are managed across both a plurality of physical store locations, warehouse locations, and online offerings, tracking availability may be unreliable and slow using previous known systems that apply store-level inventory tracking. The disclosed search system 110 applies a more efficient approach by embedding store information into a hierarchy such that a global inventory system may be dynamically managed once, instead of updating an individual store inventory and sending separate updates across other stores to update each of the many management systems in use.

Figure 4:
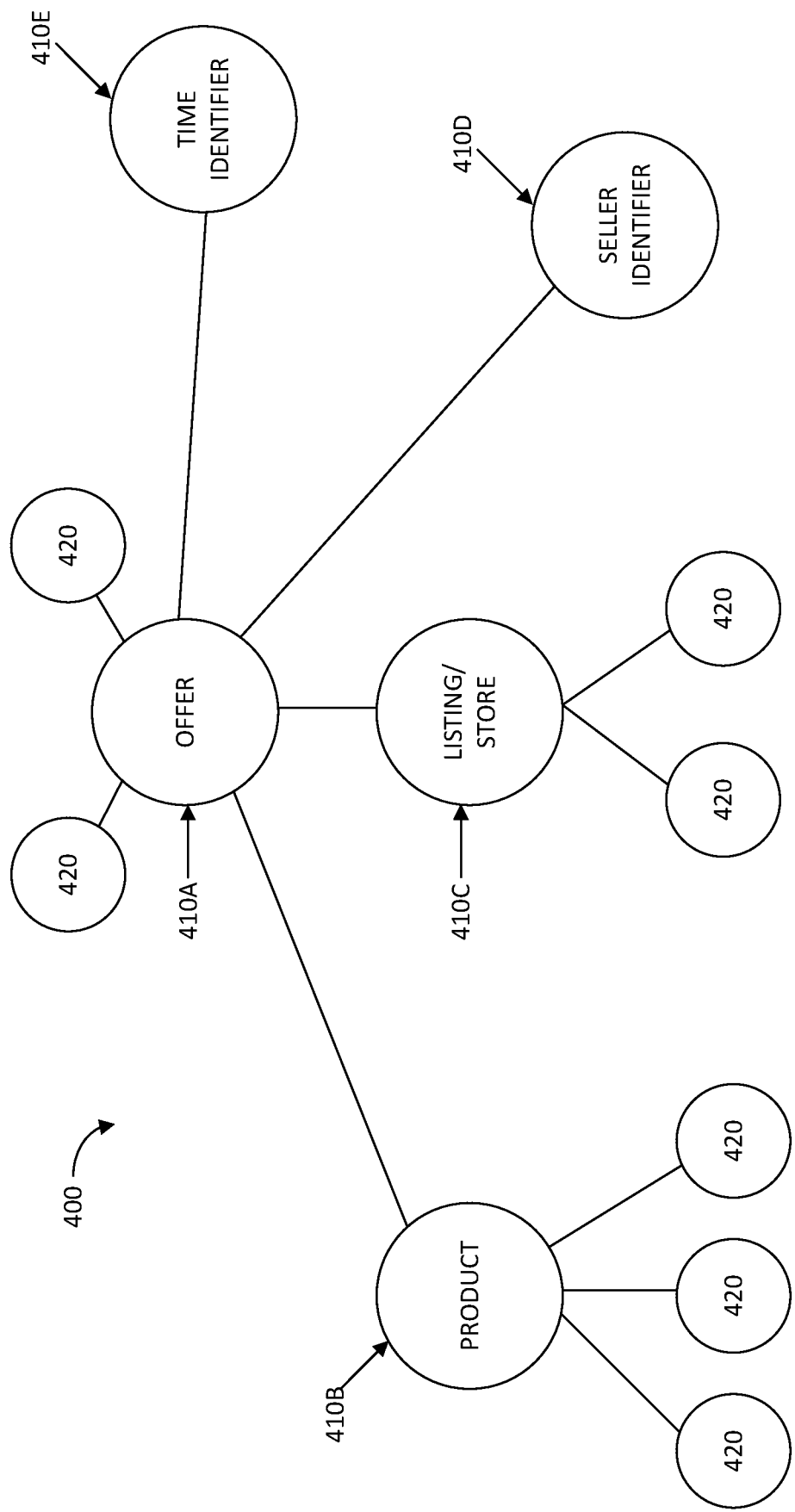
FIG. 4 is a diagram visualization of an exemplary hierarchical data structure that may be used with the system of FIG. 1, in accordance with some embodiments of the present disclosure.

FIG. 4 is a tree diagram representation an exemplary hierarchical data structure 400. The hierarchical data structure may include a plurality of interconnected clusters of data. The data may be stored as nodes with connectors between the nodes. In some embodiments, metadata may be associated with the nodes and connectors to provide context to the actual data being stored and enable further functionality and development opportunities in using the hierarchical data structure.

In some embodiments, the hierarchical data structure may include a parent-child relationship built from one or more top-level nodes 410. For example, a top-level node 410 may include an offer node 410A, a product node 410B, a listing node 410C, a seller identifier node 410D, and a time identifier node 410E. Each top-level node 410 may be a parent node to one or more sub-nodes 420. For example, each of the offer node 410A, the product node 410B, the listing node 410C, the seller identifier node 410D, and the time identifier node 410E may include one or more sub-nodes including categories of information related to the parent node. For instance, the offer node 410A may include price, offer store, LIMO, subsidy, rollup, cost, IMS inventory, and CRT information. In another example, the product node 420B may include Qarth, panama, quality score, and facet information in sub-nodes 420. In yet another example, the listing node 410C may include store validity, offer listing, store pricing, LIMO eligibility, and store inventory/availability information built into sub-nodes 420.

In at least some embodiments, the listing node 410C may be considered a store node. The store node may include information relevant to a particular physical location for retail sales and service. Therefore, the hierarchical data structure 400 is configured to tie-in store-specific data, including availability, location, past and present sales information, etc. As a result, the hierarchical data structure 400 may be configured as a global information system for inventory management without the need to update store management systems individually when back-end changes occur (e.g., offers or sales occurring at other store locations).

The hierarchical data structure 400 includes nodes 410, 420 that are tied to each other by connectors 430. The connectors 430 themselves may be customized to establish a relationship between information stored at the nodes 410, 420. For instance, a connector 430 between an offer node 410A and product node 410B may be configured to cause one or more nodes to be updated when another node is updated. For example, if a product is sold at a particular store location, an offer for the product may change, e.g., based on a change in availability or inventory location. In this way, the hierarchical data structure 400 may take advantage of clustering algorithms to maintain a dynamic and up-to-date representation of a global inventory system. Further, it should be noted that FIG. 4 is illustrated as one example of a hierarchical data structure that may be stored by the inventory management system 100, and that other hierarchical data structures may be adapted with any appropriate hierarchy with any appropriate number of nodes and connectors as necessary.

Figure 5:
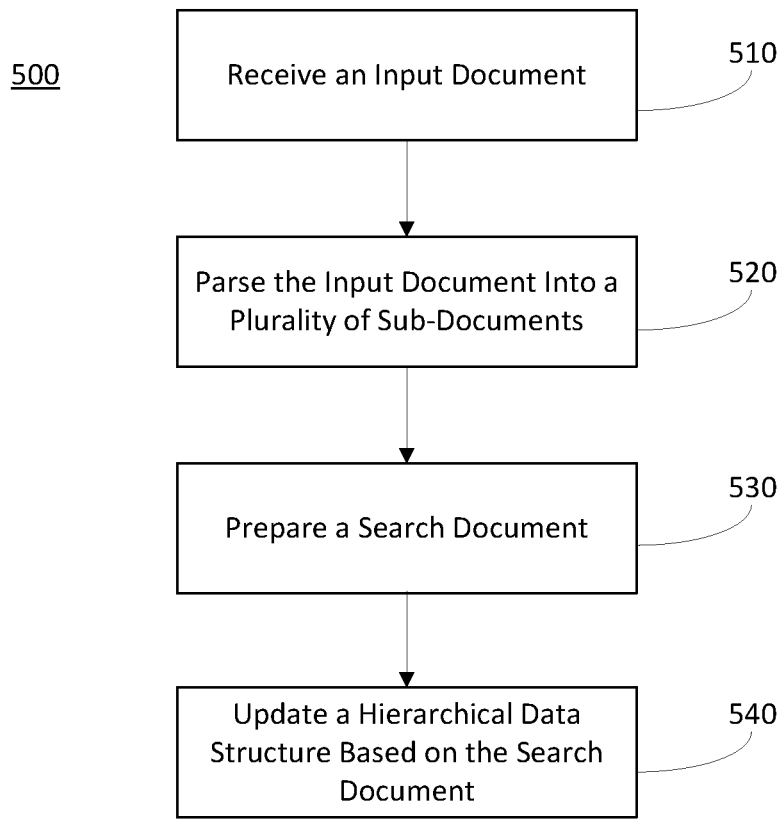
FIG. 5 illustrates a flow diagram of an exemplary inventory management indexing process using the system of FIG. 1, in accordance with some embodiments of the present disclosure.

FIG. 5 is a flowchart of an exemplary process 500 for generating a hierarchical data structure, such as the hierarchical data structure 400. One more components of the inventory management system 100 may perform one or more steps of the process 500 for generating the hierarchical data structure. The process 500 may include, for example, a creation and/or updating of a data structure, depending on whether the process is an initial or subsequent process in an inventory management service.

In step 510, the search system 110 may receive an input document from the document database 120. The input document may include information associated with a relevant retail event, such as an offer or sale of a product or service, a change inventory status, an update to an existing offer, a timing factor (e.g., the end of a sale, price reduction, etc.), an availability update, etc. In some embodiments, the search system 110 may include an information gateway such as an API connection to one or more other computing systems for receiving input documents.

In step 520, the search system 110 may parse the input document into a plurality of sub-documents. For example, the indexing system 320 may receive the input document and apply a parsing and/or filtering algorithm to identify sub-documents. In at least some embodiments, the parsing function may enable the search system 110 to receive various formats of input documents and filter out irrelevant or unnecessary information to obtain a set of sub-documents with information for creating and/or updating a hierarchical data structure. In some embodiments, the search system 110 may determine whether the number of sub-documents is greater than zero. If not, the search system 110 may determine that an input document does not contain any relevant information for updating a data structure and discard the message.

In step 530, the search system 110 prepares a search document based on the identified sub-documents. The search document may be a transition document between the data contained in the input document and the hierarchical data structure. For example, one of the indexing engines 320 may create nodes and connectors based on the information in the sub-documents and generate the search document. The indexing engine 320 may create a node, assign a relationship between the created nodes, and determine a parent and/or child node for each created node. The search document thus may contain instructions for updating the hierarchical data structure while maintaining a node-connection tree structure.

According to some embodiments, each of a plurality of indexing engines 320 may be configured to prepare a respective search document. In some embodiments, each indexing engine 320 may be associated with a different characteristic such that the plurality of indexing engines 320 work together to enable more complex gathering and writing of information into a particular data structure. For instance, each indexing engine 320 may be associated with a different data source (e.g., different sources for the document database 120 or different document databases altogether). In another example, each indexing engine 320 may use different clustering algorithms to create different nodes and connectors. For instance, one indexing engine may be configured to create and connect various offer nodes and sub-nodes while another indexing engine may create and connect various product nodes and sub-nodes.

In step 540, the search system 110 updates (inclusive of creating) a hierarchical data structure based on the search document. For instance, the data structure engine 310 may use the information in the search document to identify and/or create nodes and/or connectors relevant to the information. In one example, the data structure engine 310 may write the relationship and parent information to the hierarchical data structure. As a result of the indexing and writing process 500, raw data may be input to the search system 110 and used to dynamically maintain a clustered set of data representative of inventory information. The disclosed embodiments include tools that enable various input documents to be translated into a form for enabling dynamic updating of a hierarchical data structure having clustered information in the form of nodes and connectors that provide context to the inventory information. The hierarchical data structure is useful and has value on its own for organizing and maintain data in a reliable and accurate manner. Further, the data structure additionally works to provide an improved search function for finding information responsive to a query of the data structure.

Figure 6:
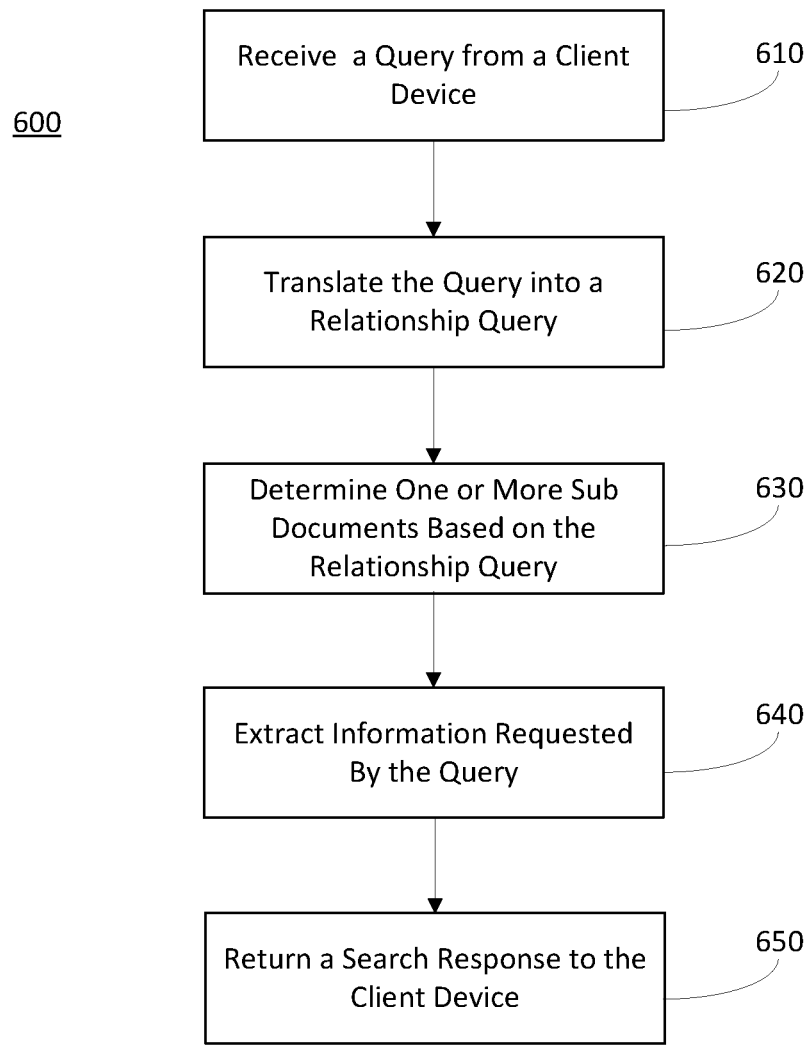
FIG. 6 illustrates a flow diagram of an exemplary inventory management querying process using the system of FIG. 1, in accordance with some embodiments of the present disclosure.

FIG. 6 is a flowchart of an exemplary process 600 for searching a hierarchical data structure, such as hierarchical data structure 400. One or more components of the inventor management system 100 may perform one or more steps of the process 600 for searching the hierarchical data structure. The process 600 may include, for example, searching of a hierarchical data structure dynamically created and updated through the process 500. In one example, the process 600 may relate to a search query originated at a client device 130 in relationship to, for example, a retail organization website presenting offers for sale. In another example, the search query may relate to a corporate-facing device for inventory management.

In step 610, the search system 110 may receive a query from a client device 130. The query may include, but is not limited to, an SQL query format. In some embodiments, the query engine 330 may receive the query from the client device 130 and check for a proper syntax, such as an SQL syntax. If the syntax is not valid, the query engine 330 may return an error response. In step 620, the search system 110 may translate the query into a relationship query format. For example, the query engine 330 may apply a clustering algorithm to the query to create a relationship query for the appropriate hierarchical data structure. The relationship query may include, for example, an identification of nodes and connectors where responsive information may be found, such as product identifying information, offer information, seller information, etc. In some embodiments, a query may be translated into multiple relationship queries for identifying responsive information.

In step 630, the search system 110 may determine one or more sub documents responsive to the relationship query based on the hierarchical data structure. The result may be one or more raw sub-documents including information responsive to the query (inclusive of locations of the stored raw documents). For example, the query engine 330 may apply the nodes and connectors found in the relationship query to return the responsive sub-documents.

In step 640, the search system 110 may extract information requested by the query from the one or more sub-documents responsive to the relationship query. For example, if a query included a request for an offer for a particular product, the query engine 330 may return the sub-documents including the pending offers for that product.

In some embodiments, the search system 110 may determine whether multiple relationship queries are related to a search query and perform aggregation of multiple results where needed. For example, the search system 100 may perform a multiple-retrieve function to compile information responsive to an original search query. The query engine 330 may proceed to extract the responsive information from the returned sub-documents.

In step 650, the search system 110 may return a search response to the client device 130. For example, the search system 110 may provide a search response including the extracted information responsive to the query in a relevant format. For example, the search system 110 may provide information in the form of an updated webpage to a client device 130 accessing a website associated with the retailer and the retailer's inventory management system.

The disclosed embodiments are applicable to data management systems for providing a hierarchical data structure that connects information stored in input documents forming the data set of the system. The disclosed embodiments may be particularly applicable to inventory management systems, including complex inventories in which data sources are large, varied, and unorganized. Disclosed embodiments provide a clustering system in which a hierarchical data structure may be dynamically maintained to include up-to-date information in a connected-node format. The disclosed embodiments may be further configured to translate search queries into a relationship query format tailored to the hierarchical data structure, thereby enabling a quick, efficient, and accurate search for information responsive to the query.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. The computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising:
    at least one document database storing a plurality of documents containing data; and
    a search server communicatively coupled to the document database, the search server comprising a data structure engine storing a hierarchical data structure, at least one indexing engine, and a non-transitory computer readable medium having instructions stored thereon, wherein the instructions, when executed by a processor cause the search server to:
        receive an input document from the document database;
        parse one or more sub documents from the input document;
        identify connections between the one or more sub documents, the connections including relationship information;
        prepare a search document based on the one or more sub documents and the identified connections, wherein the search document is a transition document between data in the input document and data in the hierarchical data structure, wherein the search document comprises instructions for updating the hierarchical data structure while maintaining a node-connection tree structure;
        update, by the data structure engine, the hierarchical data structure based on the search document; and
        in response to a query for information from the input document:
            construct a relationship query including data of the hierarchical data structure based on the query for information;
            determine, by the search server, one or more sub documents responsive to the relationship query based on the hierarchical data structure; and
            extract information requested by the query from the one or more sub documents responsive to the relationship query.

2. The system of claim 1, wherein preparing the search document comprises assigning a relationship between a sub document parsed from the input document and stored data in the hierarchical data structure.

3. The system of claim 2, wherein preparing the search document comprises determining a parent sub document for each sub document parsed from the input document.

4. The system of claim 3, wherein updating the hierarchical data structure comprises writing the relationship and parent to the hierarchical data structure by the data structure engine.

5. The system of claim 1, wherein the search server comprises a plurality of indexing engines, each configured to prepare a respective search document.

6. The system of claim 1, wherein the hierarchical data structure comprises a plurality of interconnected clusters of data.

7. The system of claim 6, wherein the plurality of interconnected clusters of data comprises at least a store cluster, an offer cluster, and a product cluster.

8. A computer-implemented method comprising:
    receiving, at an indexing engine, an input document from a document database;
    parsing one or more sub documents from the input document;
    identifying connections between the one or more sub documents, the connections including relationship information;
    preparing a search document based on the one or more sub documents, the identified connections, and an indexing algorithm associated with the indexing engine, wherein the search document is a transition document between data in the input document and data in the hierarchical data structure, wherein the search document comprises instructions for updating the hierarchical data structure while maintaining a node-connection tree structure;
    updating the hierarchical data structure based on the search document; and
    in response to a query for information from the input document:
        constructing a relationship query including data of the hierarchical data structure based on the query for information;
        determining one or more sub documents responsive to the relationship query based on the hierarchical data structure; and
        extracting information requested by the query from the one or more sub documents responsive to the relationship query.

9. The method of claim 8, wherein preparing the search document comprises assigning a relationship between a sub document parsed from the input document and stored data in the hierarchical data structure based on the indexing algorithm.

10. The method of claim 9, wherein preparing the search document comprises determining a parent sub document for each sub document parsed from the input document.

11. The method of claim 10, wherein updating the hierarchical data structure comprises writing the relationship and parent to the hierarchical data structure.

12. The method of claim 8, further comprising selecting the indexing algorithm based on the document database.

13. The method of claim 8, wherein the hierarchical data structure comprises a plurality of interconnected clusters of data.

14. The method of claim 13, wherein the plurality of interconnected clusters of data comprises at least a store cluster, an offer cluster, and a product cluster.

15. A non-transitory computer readable medium having instructions stored thereon, wherein the instructions, when executed by a processor cause a device to perform operations comprising:

receiving, at an indexing engine, an input document from a document database;

parsing one or more sub documents from the input document;

identifying connections between the one or more sub documents, the connections including relationship information;

preparing a search document based on the one or more sub documents, the identified connections, and an indexing algorithm associated with the indexing engine, wherein the search document is a transition document between data in the input document and data in the hierarchical data structure, wherein the search document comprises instructions for updating the hierarchical data structure while maintaining a node-connection tree structure;

updating the hierarchical data structure based on the search document; and in response to a query for information from the input document:

constructing a relationship query including data of the hierarchical data structure based on the query for information;

determining one or more sub documents responsive to the relationship query based on the hierarchical data structure; and extracting information requested by the query from the one or more sub documents responsive to the relationship query.

16. The non-transitory computer readable medium of claim 15, wherein preparing the search document comprises assigning a relationship between a sub document parsed from the input document and stored data in the hierarchical data structure based on the indexing algorithm.

17. The non-transitory computer readable medium of claim 16, wherein preparing the search document comprises determining a parent sub document for each sub document parsed from the input document.

18. The non-transitory computer readable medium of claim 17, wherein updating the hierarchical data structure comprises writing the relationship and parent to the hierarchical data structure.

19. The non-transitory computer readable medium of claim 15, wherein the hierarchical data structure comprises a plurality of interconnected clusters of data.

20. The non-transitory computer readable medium of claim 19, wherein the plurality of interconnected clusters of data comprises at least a store cluster, an offer cluster, and a product cluster.

\* \* \* \* \*